(12) United States Patent
Märtens et al.

(10) Patent No.: US 9,955,047 B2
(45) Date of Patent: Apr. 24, 2018

(54) METHOD AND DEVICE FOR ACQUIRING STREAM OF THE PRECISELY TIME-STAMPED IMAGES

(71) Applicants: Tallinn University of Technology, Tallinn (EE); OÜ Eliko Tehnoloogia Arenduskeskus, Tallinn (EE)

(72) Inventors: Olev Märtens, Tallinn (EE); Ago Mõlder, Tallinn (EE); Raul Land, Tallinn (EE); Tõnis Saar, Tallinn (EE); Marko Reidla, Tartu maakond (EE); Douglas Reid, Hiiu maakond (EE); Alexander Girfanov, Tallinn (EE)

(73) Assignees: Tallinn University of Technology, Tallinn (EE); OU Eliko Tehnoloogia Arenduskeskus, Tallinn (EE)

( * ) Notice: Subject to any disclaimer, the term of this patent is extended or adjusted under 35 U.S.C. 154(b) by 174 days.

(21) Appl. No.: 14/972,285

(22) Filed: Dec. 17, 2015

(65) Prior Publication Data
US 2016/0182768 A1   Jun. 23, 2016

(30) Foreign Application Priority Data
Dec. 18, 2014  (EE) .................................. 201400044

(51) Int. Cl.
*H04N 5/04* (2006.01)
*A63B 23/12* (2006.01)
(Continued)

(52) U.S. Cl.
CPC ........... *H04N 5/04* (2013.01); *A63B 21/4037* (2015.10); *A63B 21/4039* (2015.10);
(Continued)

(58) Field of Classification Search
CPC . H04N 5/04; H04N 5/225; H04N 7/18; G01S 19/42
(Continued)

(56) References Cited

U.S. PATENT DOCUMENTS 6,012,115 A * 1/2000 Chambers ............. G06F 13/426
                                                      710/100
6,340,991 B1  1/2002 Chen et al.
(Continued)

FOREIGN PATENT DOCUMENTS

| JP | 5213045 B2 | 6/2013 |
|---|---|---|
| WO | 2013092248 A1 | 6/2013 |

OTHER PUBLICATIONS

Litos, G. et al., "Synchronous Image Acquisition based on Network Synchronixation", Proceedings of the 2006 Conference on Computer Vision and Pattern Recognition Workshop (CVPRW'06), 0-7695-2646-2/06, IEEE 2006.
(Continued)

*Primary Examiner* — Seung C Sohn
(74) *Attorney, Agent, or Firm* — Berggren LLP

(57) ABSTRACT

Method and device for acquiring stream of the precisely time-stamped images, including the modulated light source, controlled by the absolute global real-time-base (e.g. provided by global navigation satellite system (GNSS) controller) and the image acquisition and processing unit, decoding the light modulation waveform and determining the time-stamp for every image frame. The GNSS time and position messages can be used to provide the full time- and location stamps for each frame. Multi-element light sources can be used to have more informative light modulation in the time domain. For time-stamping of several image streams (e.g. from several cameras) multiple light sources with the same modulation can be used.

16 Claims, 4 Drawing Sheets

(51) Int. Cl.
- *A63B 21/00* (2006.01)
- *G01S 19/14* (2010.01)
- *G01S 3/781* (2006.01)
- *A63B 69/12* (2006.01)
- *A63B 21/008* (2006.01)
- *A63B 22/06* (2006.01)
- *A63B 23/04* (2006.01)

(52) U.S. Cl.
CPC .......... *A63B 23/1272* (2013.01); *G01S 3/781* (2013.01); *G01S 19/14* (2013.01); *A63B 21/0084* (2013.01); *A63B 22/0605* (2013.01); *A63B 23/0488* (2013.01); *A63B 69/12* (2013.01); *A63B 2208/0242* (2013.01); *A63B 2208/0252* (2013.01); *A63B 2208/03* (2013.01)

(58) Field of Classification Search
USPC .................................................. 250/227.11
See application file for complete search history.

(56) References Cited

U.S. PATENT DOCUMENTS

| | | | |
|---|---|---|---|
| 6,542,183 B1* | 4/2003 | DeAngelis | A63B 24/0003 348/157 |
| 7,428,345 B2* | 9/2008 | Caspi | G06T 7/20 348/36 |
| 8,326,087 B2* | 12/2012 | Perronnin | G06F 17/30247 348/513 |
| 8,654,251 B2 | 2/2014 | Azzopardi | |
| 8,717,422 B2 | 5/2014 | Hewes et al. | |
| 8,762,762 B2* | 6/2014 | Foster | G06F 1/12 713/400 |
| 2011/0035174 A1 | 2/2011 | Lahiri et al. | |

OTHER PUBLICATIONS

Zhao, Qi et al., "High-precision synchronization of video cameras using a single binary light source", J. Electron. Imaging, 18(4), 040501, Oct. 20, 2009.

* cited by examiner

METHOD AND DEVICE FOR ACQUIRING STREAM OF THE PRECISELY TIME-STAMPED IMAGES

PRIORITY

This application claims priority of Estonian national application number P201400044 filed on Dec. 18, 2014, the contents of which are incorporated herein by reference in its entirety.

FIELD OF THE INVENTION

The invention belongs to the field of the image acquisition and processing with possible applications for image based measurement systems, where precise timing (often together with precise positioning) of the measurement instances is required. As examples of such systems are 3-D road scanners, for which precise road profile and road parameters are calculated from the acquired camera images and there is a need to relate these image frames to the global positioning and timing.

In addition, the invention could be used to match the images from two or more cameras (e.g. for stereo vision applications) in the time domain, by using of the corresponding time stamps.

BACKGROUND OF THE INVENTION

There are known solutions, where acquired images are time-synchronized via special hardware (e.g. U.S. Pat. No. 8,654,251B and U.S. Pat. No. 8,717,422B, G. Litos et al, "Synchronous Image Acquisition based on Network Synchronization" etc). Such solutions are sophisticated and costly to be implemented, as requiring complex hardware and wiring. In addition, the network synchronization in computer systems has significant latencies and uncertainties, in the order of tens of milliseconds.

There are also known solutions, where frames of the acquired image streams are synchronized or related to each other by monitoring, and matching (in the algorithm) the moving objects (e.g. feature points) by various cameras, in parallel. The drawback of such solutions is that the frames are not still connected to the (absolute) time-base, so also making it impossible to track the positions of the image frames. In addition, such algorithms are computationally sophisticated and time consuming, as the objects (feature points) are located at unknown co-ordinates and have unknown and unpredictable features. In addition, results of such approach depend much on the illumination of the scene conditions.

Also, there are known multi-camera solutions, where the cameras are synchronized to each other by using of the binary modulated (by special pattern) light source (e.g. LED), being visible in the image frames, e.g. as described in US2011035174A and Japanese patent specification JP5213045B2.

The closest solution known in the art is described in the paper (Qi Zhao, Y. Q. Chen, "High-precision synchronization of video cameras using a single binary light source", J. Electron. Imaging. 18(4), 040501, Oct. 20, 2009), where the frames are matched to each other by using of the modulated binary light source and by decoding this binary modulated light intensity in the post-processing stage. The drawback of this and other solutions is that the frames are still not related to the (absolute) time base, so also making it impossible to track and map the positions (co-ordinates) of the capture of image frames. Thus, there is a need for new improved method and device for precise time-stamping of the image frames.

SUMMARY OF THE INVENTION

Objective of the invention is to provide all image frames of the one, two (as for stereo vision case) or multiple image streams with the precise global and absolute time-stamps. Additionally the global position information can be added to the time-stamp.

The objective of the invention is achieved by the proposed solution, comprising a modulated light source and means for image acquisition and processing, containing the function of decoding of the light intensity modulation by introducing the real-time absolute time-base, controlling directly the light modulation, and that the absolute time-stamp for every frame is calculated from the time-domain waveform of the variation of the modulated light intensity in the sequence of the frames.

An aspect of the invention is that the absolute time-base is received from the global navigation satellite system (GNSS).

Another aspect of the invention is that the pulse-per-time-unit (e.g. PPS as "pulse per second") signal of the GNSS solution controls directly the mentioned light intensity modulation.

Yet another aspect of the invention is that the time stamps are extended by the full time information, by using of the corresponding messages from the GNSS.

Another aspect of the invention is that the position information (e.g. in the form of coordinates) from the GNSS messages are added to the time-stamp information.

Still another aspect of the invention is to use binary modulation (On/Off) of the mentioned light intensity or alternatively continuous-in-time modulation of this light intensity could be used.

It could be advantageous to use the multi-element light source as the modulated light source, where the light intensity of the each light source element is modulated by its own unique time-domain modulation waveform.

Alternatively, it could be reasonable, for time-stamping of two or several imaging streams, the usage of the several light sources with the same modulation waveform.

In addition, it could be advantageous that the demodulated light intensity waveform is compared to the expected (reference) waveform and the frame-rate of the image acquisition is continuously adjusted to have approximately the expected timing of the acquiring of the image frames.

It is an object of this invention to provide a method to provide all image frames of one, two or multiple image streams with precise global and absolute time-stamps, said method comprising the steps of: providing a modulated light source and means for image acquisition and processing, decoding light intensity modulation by introducing a real-time absolute time-base, controlling directly the light modulation, and calculating an absolute time-stamp for every frame from a time-domain waveform of variation of the modulated light intensity in a sequence of the frames.

It is an object of this invention to provide a method of acquiring stream of precisely time-stamped images said method comprising the steps of: providing a time-domain modulated light intensity together with image acquisition and processing, decoding variation of the modulated light intensity of the sequence of the image frames, relating the light modulation directly to a real-time absolute time-base; and calculating absolute time-stamp for every frame from a time-domain waveform of variation of the decoded variation of the modulated light intensity in a sequence frames.

DETAILED DESCRIPTION OF THE INVENTION

Figure 1:
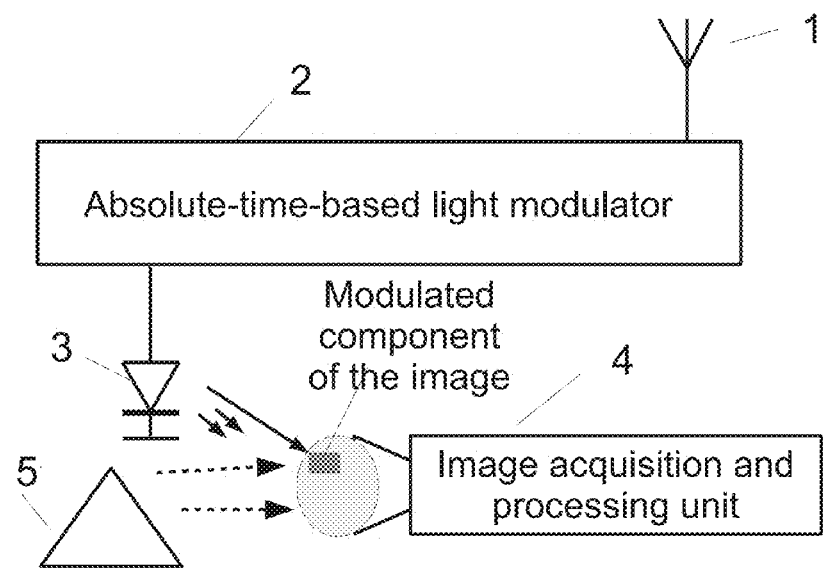
FIG. 1 describes the essence of the invention in the form of the block diagram.

FIG. 1 shows a solution containing the connection 1 to the absolute time source (e.g., the GNSS satellites or other precise time source), a light modulator on the base of the absolute time 2, input of which is connected to the connection 1 and the output of which is connected to the light source 3 (for example, the LED light), image acquisition and processing unit 4 and the captures scene 5, wherein the image acquisition and processing unit 4 identifies the modulated light from a light source 3 and monitors the dynamic scene 5.

As the light modulation is related to the absolute time, it is possible from the image frame sequences to decode the modulation of this light intensity modulation and, thus the image frames of the scene can be associated with the real and absolute time.

Figure 2:
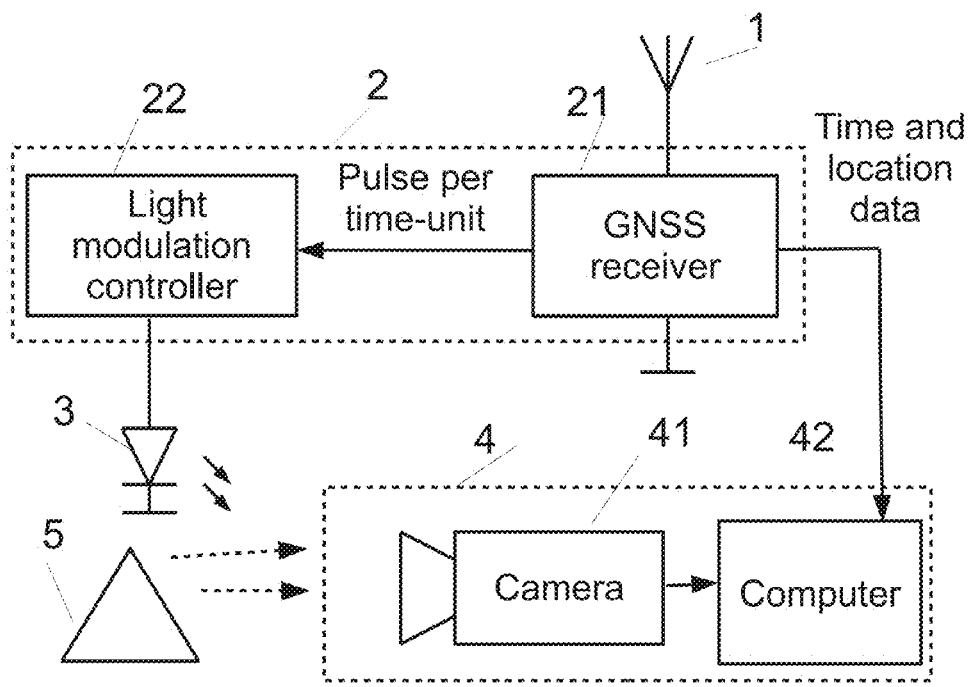
FIG. 2 through FIG. 7 shows the various aspects of the implementation examples of the invention.

FIG. 2 shows that the light intensity modulator based on absolute time may comprise a GNSS (e.g., GPS) receiver 21, and the light modulation controller 22, wherein pulse per unit of time (for example, of pulse per second) output of the GNSS receiver is connected to the input of the light intensity modulation controller 22, in such a way that it generates at every new absolute time unit of (for example, every second), the unique modulation pattern.

In addition, as shown in FIG. 2, the image acquisition and processing unit 4 may include a camera 41 and a computer 42.

It is also shown in FIG. 2, that in addition the GNSS receiver may sent to the computer the full time and/or location information by the respective (e.g., in NMEA format) messages. Thus, it is possible to computer to combine for a particular image frame the approximate time of this message (for typical GNSS receivers, the error is substantially less than one second) and accurate (typically better than 1 microsecond) "pulse per unit time", which passes through the route of light modulation from the controller 22 through the light source 3 and the camera 41, and is decoded by the computer (or dedicated image processor) 42. It is also possible by similar messages (such as NMEA format) to add location information to each frame (e.g. as GNSS coordinates). If necessary, the precise time and location values could be interpolated from the decoded waveform of the modulated light intensity.

Figure 3:
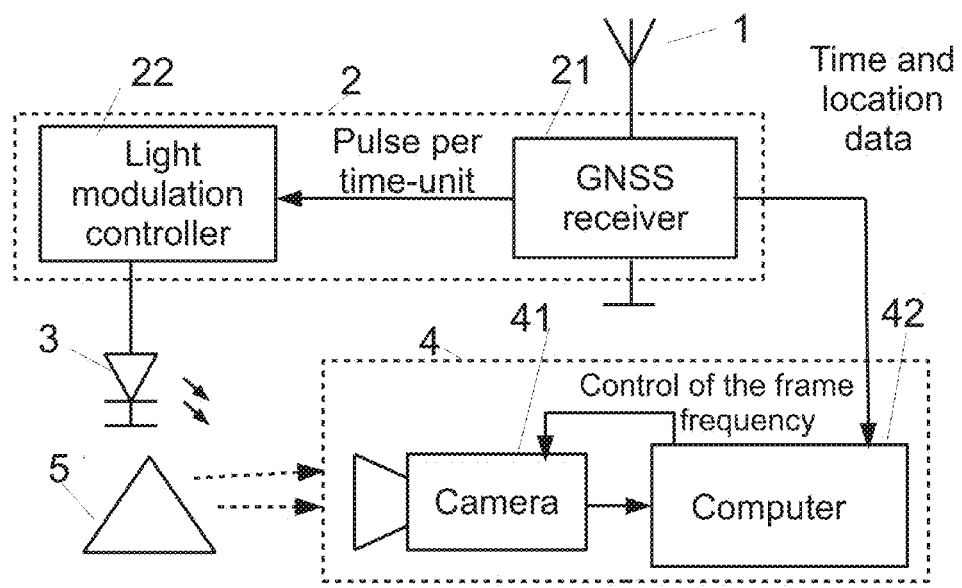

FIG. 3 shows that the computer 42 may control the frame rate of the camera 41 at the image acquisition. The frame rate could be automatically adjusted so, that into the time unit (for example, one second) a integer number of frames fits. In such case, it is computationally easy for the GNSS receiver to perform the corresponding interpolation of the time and location of the messages for the particular image frame.

Figure 4:
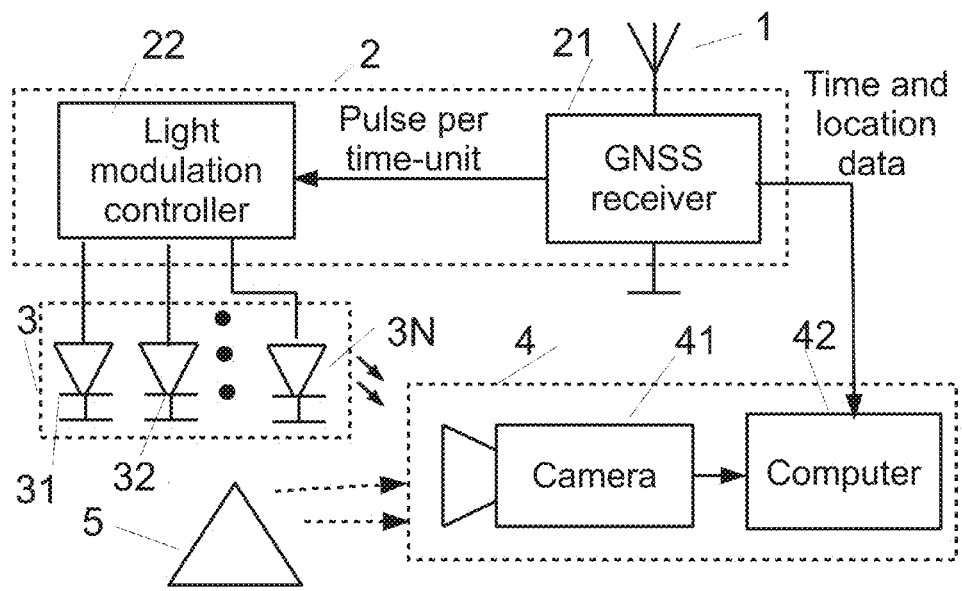
Figure 5:
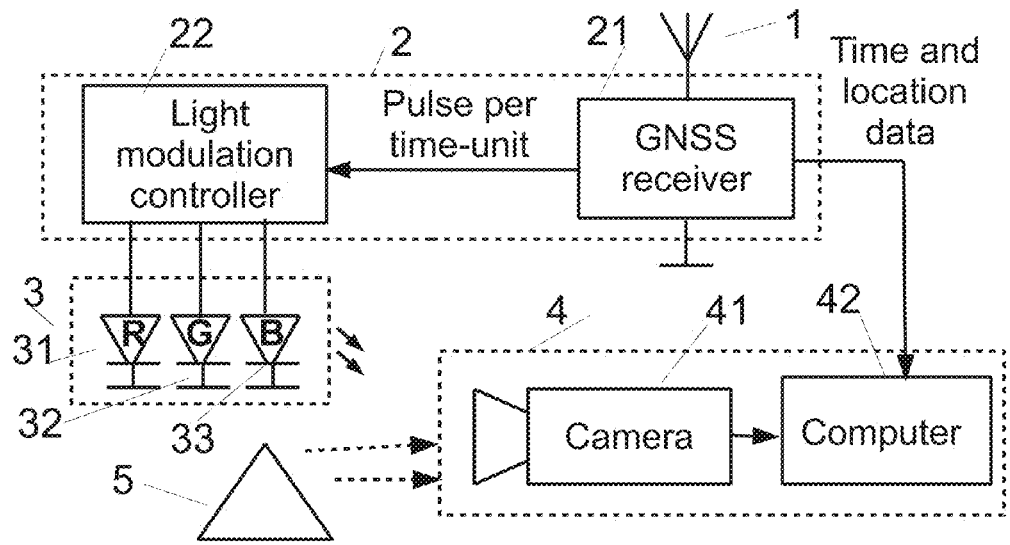
Figure 6:
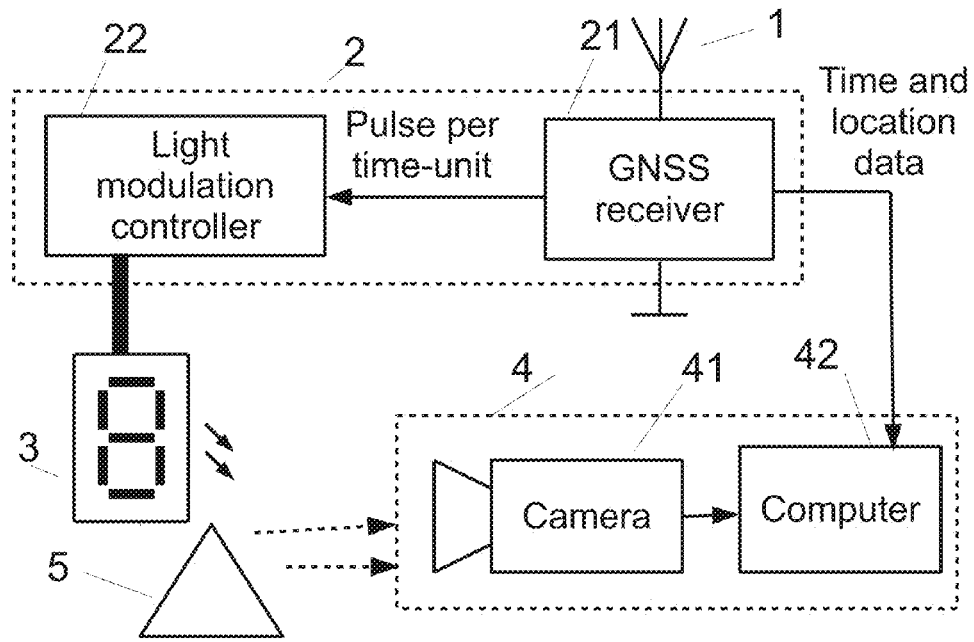

FIG. 4 to FIG. 6 show the variants for the implementation of the light source 3, where the light source is consisting of multiple elements 31, 32, . . . 3N), modulation of each is controlled individually. For the implementation example according to FIG. 4, the light source comprises three identical elements (dots or dashes), and status of each lighting element (switched on or off) is found from the images. So, it is possible to modulate the light in a multi-bit way, for example, to detect not only a change of the 1 second time, but a smaller changes per unit time can be indicated, so allowing faster and more accurate determining of the frequency of the frames. Reasonable herein may be to use instead of the combinatorial N-bit code—the Gray or a "thermometer" code (such as variable length or height of the LED strip).

FIG. 5 shows a three-color light source, by using of the RGB LED elements. This allows to use the color information for multi-bit light modulation.

FIG. 6 shows multi-segment (for example, 7-element) indicator (s) being used as the light source 3. In this case, the immediate absolute time or a part of it, for example, of milliseconds of it, can be directly displayed onto the image, and the computer can by corresponding image processing decode the absolute time value (from the on-off states of these segments and by the corresponding decimal number notation by segments).

Figure 7:
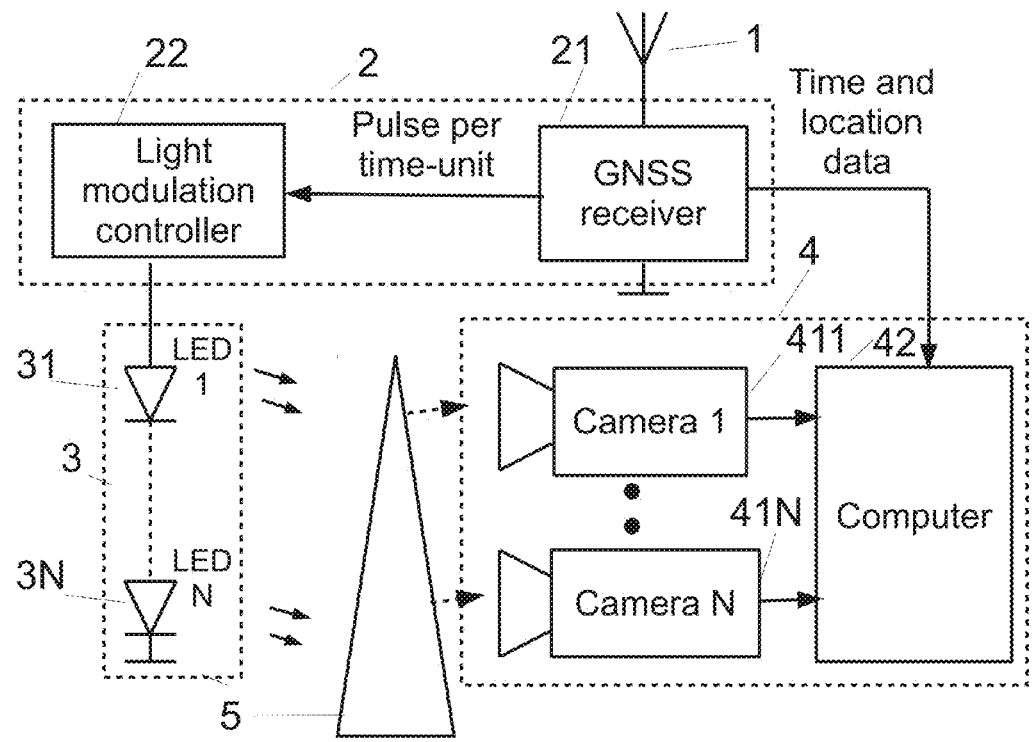

FIG. 7 shows a solution, in which the image processing system has multiple (two or more) cameras (411 . . . 41N) and one or many (two or more) of light source elements (31 . . . 3N), wherein the light elements are electrically connected together (in series or in parallel) and so modulated by the same waveform. In this case, each camera image stream is modulated with the same pattern of light and it is possible from the images frames from parallel camera streams to provide the absolute (global) time—(and the location) stamps.

Also beneficial could be the solution (not shown on the figures) for which the various light elements (e.g., LEDs 31, . . . , 3N) are connected to a plurality of light modulators, based on the absolute time, e.g. controlled by pulse-per-second signal, as all the light modulation controllers 22 are linked (synchronized), the absolute global time (of, e.g. GNSS system) with very high precision. In such case all individual elements of modulated light are exactly the same, and it is possible to generate accurate global time stamps, from the decoded images of the light modulation. So, the image frames from various camera streams can be compared with each other in time, which is necessary, for example, for stereoscopic (3D) or other applications using various cameras simultaneously.

Figure 8:
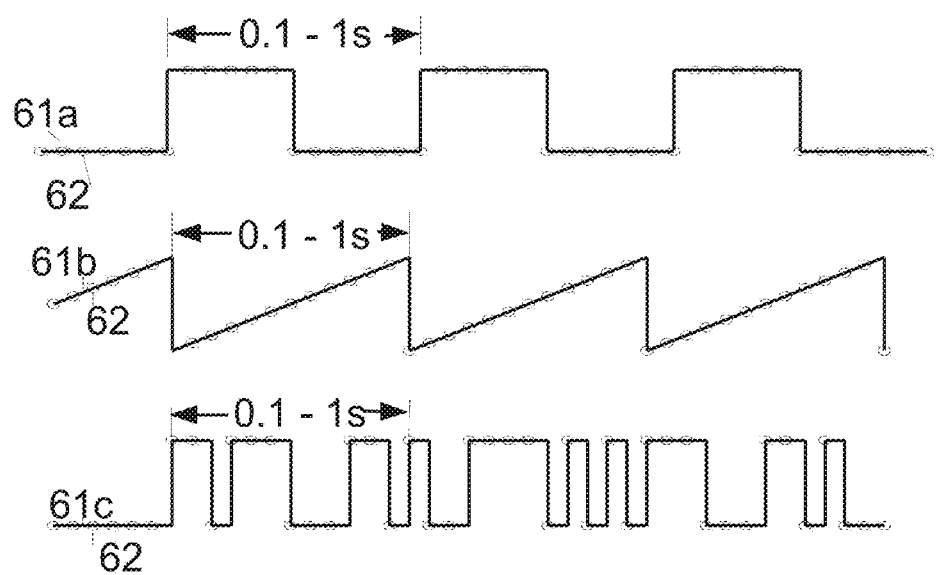
FIG. 8 gives some possible waveforms of the light modulation.

FIG. 8 shows possible and reasonable waveforms for the light intensity modulation: 61a—rectangular (binary) waveform with the period corresponding to the GNSS receiver pulse-unit time period of the signal, for example, 1, or 0.1 seconds; 61b—a saw-tooth-shaped waveform, also with the pulse per unit time period, enabling by continuously changing modulation waveform to achieve better time-resolution within this period; 61C—pseudo-random binary signal with image frame capturing moments 62, synchronized (triggered) by the pulse per unit signal of the GNSS receiver 21. The pseudo-random modulation with known waveform makes it possible to distinguish the different periods, as well for the specific cases being better to be decoded at various disturbances in the background.

The invention is characterized by the following clauses:

1. Method for acquiring stream of the precisely time-stamped images, including the time-domain modulated light intensity together with image acquisition and processing, in which the variation of the modulated light intensity of the sequence of the image frames is decoded, characterized that the light modulation is directly related to the real-time absolute time-base and that the absolute time-stamp for every frame is calculated from the time-domain waveform of the variation of the decoded from the sequence of the modulated image frames light intensity waveform 2. Method according to clause 1, characterized that the absolute real-time time base is directly using the received global navigation satellite system (GNSS) signal.

3. Method according to clause 2, characterized that the light modulation is directly controlled by the pulse-per-time-unit signal generated by the received GNSS signal.

4. Method according to clause 3, characterized that the full time-stamp of the image frame is combined together from the outputted by the GNSS solution time-message and decoded modulation time domain waveform of the light intensity 5. Method according to clause 4, characterized that the full time-stamp includes also the location information, derived from the GNSS messages 6. Method according to clause 4, characterized that the light intensity modulation has a binary waveform, controlled directly by the pulse-per-time unit signal of the GNSS solution.

7. Method according to clause 4, characterized that the light modulation has a continuously changing time-domain waveform, controlled directly by the pulse-per-time-unit signal of the GNSS solution.

8. Method according to clause 1, characterized that the modulated light source contains several light emitting elements, each modulated by the different unique time-domain waveform.

9. Method according to clause 1, for time-stamping of frames of the several simultaneous continuous image streams, characterized that the light intensity modulation is performed by several light sources, all modulated by the same waveform.

10. Method according to clause 1, characterized that the demodulated light intensity waveform is compared to the expected (reference) waveform in the time-domain and the frame-rate of the image acquisition is continuously adjusted to have approximately the expected timing of the acquiring of the image frames.

11. Device for acquiring stream of the precisely time-stamped images, including at least one modulated light source (3) and at least one image acquisition and processing unit (4), containing the functional unit to decode the light modulation waveform, controller (22), output of which is connected to the modulation input of the light source, characterized that the controller (22) is the absolute global real-time controller (e.g using GNSS) and the image acquisition and processing unit includes the functional unit for calculation of the values of the absolute time-stamp for every image frame.

What is claimed is:

1. A method for acquiring at least one stream of precisely time-stamped image frames, comprising:
   receiving, by a light modulation controller, a real-time absolute time base signal from an absolute time source;
   providing, by the light modulation controller, at least one modulation signal based on the real-time absolute time base signal; and
   modulating, by the light modulation controller using the at least one modulation signal, at least one light source to generate at least one light modulated signal,
   so that an image acquisition and processing system comprising at least one camera and an image processor is configured to acquire, by the camera, at least one stream of image frames and the at least one light modulated signal, and to generate, by the image processor using the acquired signals, the at least one stream of precisely time-stamped image frames from the at least one stream of image frames.

2. The method of claim 1, wherein, the absolute time source is provided using satellite communications.

3. The method of claim 1, wherein the absolute time source is provided by a global navigation satellite system (GNSS).

4. The method of claim 1, wherein generating the at least one stream of precisely time-stamped image frames comprises calculating an absolute time stamp for each image frame of the at least one stream of image frames using a modulated light intensity in the at least one light modulated signal by decoding a time-domain waveform of variation of the modulated light intensity through the at least one stream of image frames, so that each of the precise time-stamped image frames comprises the calculated absolute time stamp.

5. The method of claim 1, wherein the real-time absolute time base signal is a pulse-per-time-unit signal from a global navigation satellite system (GNSS) receiver/controller.

6. The method of claim 5, wherein each of the precise time-stamped image frames comprises a time-message provided to the image processor directly by the GNSS receiver/controller.

7. The method of claim 5, wherein each of the precise time-stamped image frames comprises a location information provided to the image processor directly by the GNSS receiver/controller.

8. The method according to claim 5, wherein the at least one light modulated signal
   comprises a binary waveform, controlled by the pulse-per-time unit signal from the GNSS receiver/controller.

9. The method according to claim 5, wherein the at least one light modulated signal comprises a continuously changing time-domain waveform, controlled by the pulse-per-time unit signal from the GNSS receiver/controller.

10. The method of claim 1, wherein the at least one light source comprises one or more light emitting diodes (LEDs).

11. The method of claim 1, wherein the at least one light source contains a plurality of light emitting elements, each modulated by a different unique time-domain waveform.

12. The method of claim 1, wherein the at least one stream of image frames comprises a plurality of streams of image frames, the at least one light source comprises a plurality of light emitting elements, each modulated by an identical time-domain waveform, so that at least one light modulated signal comprises a plurality of light modulated signals from the plurality of light emitting elements, and the at least one camera comprises a plurality of cameras,
   where each camera of the plurality of cameras is configured to acquire one of the plurality of streams of image frames and one of the of light modulated signals from the corresponding light emitting element of the a plurality of light emitting elements, so that the image processor is configured to provide precisely time-stamped image frames for each of the plurality of streams of image frames.

13. The method of claim 1, wherein a time-domain waveform of the modulated light intensity, after being demodulated by the image processor, is compared with a reference waveform for continuous adjustment to provide a substantially expected timing of acquisition of the image frames.

14. An apparatus for providing at least one stream of precisely time-stamped image frames, comprising:
- an absolute time source configured to provide a real-time absolute time base signal;
- a light modulation controller configured, in response to the real-time absolute time base signal from the absolute time source, to provide at least one modulation signal;
- at least one light source, configured to generate at least one light modulated signal in response to the at least one modulation signal; and
- an image acquisition and processing system comprising at least one camera and an image processor, configured to acquire, by the camera, at least one stream of image frames and the at least one light modulated signal, and to generate, by the image processor using the acquired signals, the at least one stream of precisely time-stamped image frames from the at least one stream of image frames.

15. The apparatus of claim 14, wherein the absolute time source is provided using satellite communications.

16. The apparatus of claim 14, wherein the absolute time source is provided by a global navigation satellite system (GNSS).

* * * * *